June 18, 1963 C. G. SONTHEIMER 3,094,668
ISOLATOR SYSTEM PROVIDING LOW ATTENUATION FOR INPUT SIGNALS AND EXTREMELY HIGH ATTENUATION FOR SIGNALS ATTEMPTING TO PASS IN THE REVERSE DIRECTION
Filed Feb. 20, 1959
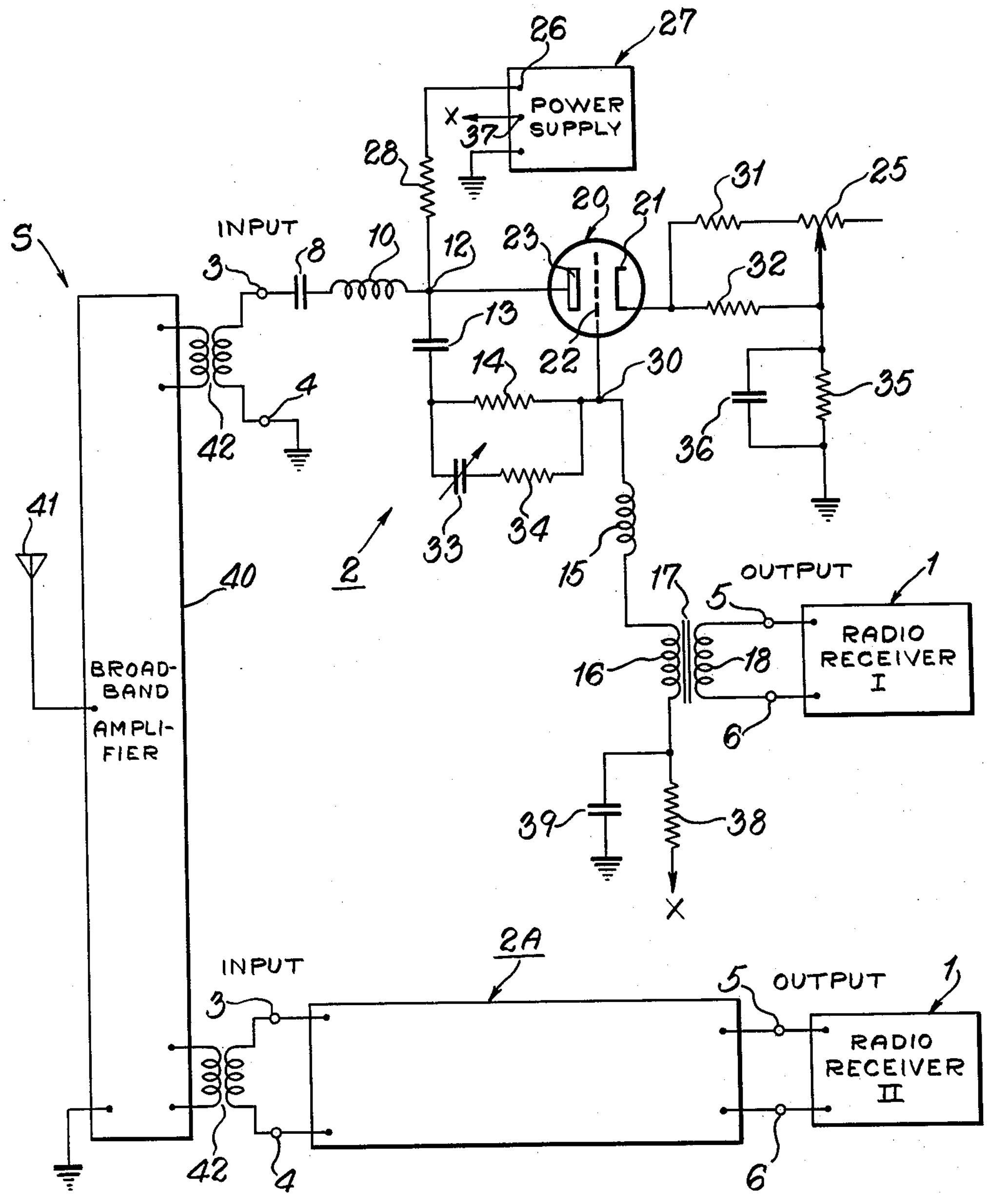
INVENTOR.
CARL G. SONTHEIMER
BY
Curtis, Morris & Safford
ATTORNEYS United States Patent Office 3,094,668

Patented June 18, 1963

3,094,668

ISOLATOR SYSTEM PROVIDING LOW ATTENUATION FOR INPUT SIGNALS AND EXTREMELY HIGH ATTENUATION FOR SIGNALS ATTEMPTING TO PASS IN THE REVERSE DIRECTION

Carl G. Sontheimer, South Norwalk, Conn., assignor to Trak Electronics Company, Inc., a corporation of Connecticut Filed Feb. 20, 1959, Ser. No. 794,640
12 Claims. (Cl. 328—209)

This invention relates to an isolator system providing low attenuation for signals which are sent through the system in the forward direction and providing extremely high attenuation for any signals attempting to pass through the system in the reverse direction. More particularly this invention relates to an electronic isolator system capable of operating over a wide range of frequencies.

In communication installations there are applications which require that one source of signals operate a number of independent devices. To provide for proper operation of these independent devices it is important that each one of them be isolated from the common source of signals and from each other. For example, it may be desired to connect a number of individual radio receivers to a common antenna. Each one of the receivers is intended to perform its own job independently of and without interference from the other receivers.

Among the many advantages of the isolator system disclosed as illustrative of this invention are those resulting from the fact that the system provides extremely high attenuation for any signals attempting to sneak back through the system in the reverse direction. As a result, the isolator system is quite effective in providing the desired isolation action and enables a large number of independent devices to be operated from a single source without any significant interference between them. Moreover, the wide range of frequencies which are accommodated by the isolation system make it well suited for use with radio receivers or other devices capable of operating over wide bands of frequencies.

In this specification and in the accompanying drawing is described an isolator system which embodies the present invention, and it is to be understood that this is not intended to be exhaustive nor limiting of the invention, but rather is given for purposes of illustration in order that others skilled in the art may fully understand the invention and the manner of applying the isolation system in practical use so that they may modify and adapt it in various forms; each as may be best suited to the conditions of a particular use.

The various objects, aspects, and advantages of the present invention will be more fully understood from a consideration of the following specification in conjunction with the accompanying drawing. This drawing is a schematic circuit diagram of an isolator system for operating a number of independent devices 1, for example such as radio receivers as indicated in block form at I and II, from a common signal source S, shown by way of example as an antenna and broad-band amplifier. The isolator system includes a first isolator circuit, generally indicated at 2, and a second isolator circuit 2A which is identical with the circuit 2. This circuit 2A is shown in block form for convenience of illustration.

Signals from the source S are fed into the input of the isolator circuit 2 through a pair of input terminals 3 and 4. The independent device 1 which is being operated from the source S is connected to a pair of output terminals 5 and 6.

This isolator circuit 2 causes little attenuation of signals passing through it in the forward direction. The input signals are coupled through a capacitor 8 and a peaking coil 10 to a junction point 12. From the point 12 the signals continue in the forward direction through a capacitor 13, a resistor 14, a second peaking coil 15 to the primary 16 of an output transformer 17 having its secondary 18 connected to the output terminals.

In the reverse direction there is an extremely high attenuation because any signals tending to pass from the secondary 18 through the resistor 14 are cancelled out by the action of the electronic amplifier stage 20. In this example the electronic stage 20 is shown as a triode having a common electrode or cathode 21, a control electrode or grid 22 and a controlled electrode or anode 23. The action of the electronic stage 20 is to furnish to the junction point 12 a signal current which is 180° out of phase with any signal currents from the secondary 18 and passing through the resistor 14 in the reverse direction. Thus, there is a cancellation at the junction point 12 and hence at the input terminals of any signals trying to go back through the circuit 2. The gain of the electronic stage 20 is adjusted by means of an adjustable resistor 25 to provide the exact cancellation.

This isolator circuit 2 is capable of operating over a wide frequency range, for example, from 2 to 32 megacycles because it is untuned. By adjusting the effective value of the control resistor 25, the amount of out-of-phase current is reduced until exact cancellation is provided. This signal cancellation is independent of the values of the output and input impedances.

For purposes of blocking the power supply voltage from the control electrode 22, the capacitor 13 is inserted between the junction point 12 and the resistor 14. The supply voltage is fed from a terminal 26 of a power supply 27 through a decoupling resistor 28 to the point 12 connected to the controlled electrode 23.

To improve the transmission at high frequencies, the peaking coil 15 is added in series with the output. Its purpose is to neutralize the effects of stray capacity between the control electrode connection point 30 and the environment. The peaking coil 10 is similarly provided to neutralize effects of stray capacitance at the input to the circuit.

Because of the stray capacitance appearing across the resistor network 25, 31 and 32, the backward cancellation action of the stage 20 tends to shift in phase as the frequency increases. Thus, an adjustable trimming capacitor 33 is connected across the resistor 14 to maintain the desired cancellation balance at the input terminals for the higher frequencies within the range of operation. A further improvement in the balance can be made by adding a resistor 34 of small value in series with the trimming capacitor 33.

In order to stabilize the operating point of the stage 20, a stabilizing network 35, 36 is connected between the resistance network 25, 31, 32 and the common return circuit, as indicated by the "ground" symbol. This stabilizing network includes a resistor 35 shunted by a large capacitance 36. This resistor 35 and the large by-pass capacitor 36 act to set the operating current through the stage 20 at the desired value. By virtue of the fact that the resistor 35 is relatively large and is located in the circuit to the common electrode 21, the stage 20 is effectively supplied by a constant current source, thus stabilizing its operating point. As a result, the circuit 2 will remain in balance over a long period of time despite any changes in the parameters of the stage 20 due to ageing or changes in the supply voltage.

Because of the presence of the large resistor 35 in the circuit connected to the common electrode 21, a suitable positive operating bias voltage must be applied to the control electrode 22. This positive bias voltage is fed from a supply terminal 37 of the source 27 through a resistor 38 and through the primary winding 16 and the peaking coil 15 to the control electrode. The connection from supply terminal 37 to the resistor 38 is indicated schematically at x—x, as will be understood. The shunt capacitor 39 bypasses radio-frequency signals to the common return "ground" circuit.

In order for the isolator circuit 2 to remain in balance over a full operating range, the resistance network 25, 31, and 32 should be of a high quality with a minimum of capacitance or inductance associated therewith. In practice the best way to build this resistance network 25, 31 and 32 is to use a high quality resistor 32 of somewhat higher value than the desired composite value and then to shunt this resistor 32 with a fixed resistor 31 and an adjustable resistor 25. Both the fixed resistor 31 and the adjustable resistor 25 should have a minimum amount of stray capacitance or inductance associated therewith.

In operation, the adjustable resistor 25 is adjusted to produce maximum attenuation in the reverse direction over the full operating range and this adjustment compensates for the tolerances of the other circuit components.

The reason it is found desirable to use a transformer 17 to feed the output terminals 5 and 6 is to present an impedance level at the input of the receiver 1 which matches the input impedance of the receiver so as to maximize the forward power transfer into the receiver and at the same time to operate the stage 20 at a higher impedance level.

The broad-band amplifier 40 feeds the signals from the antenna 41 into the respective input terminals 3 and 4 through coupling transformers 42.

Component values which work well in the isolator circuits 2 and 2A are as follows:

| | |
|---|---|
| Stage 20 | Vacuum tube 417-A/5842. |
| C13 | .01 microfarad. |
| C36 | .01 microfarad. |
| C39 | .01 microfarad. |
| C33 | .5–1.5 micromicrofarad. |
| R14 | 510 ohms. |
| R25 | 1,000 ohms. |
| R31 | 2,400 ohms. |
| R32 | 560 ohms. |
| R35 | 360 ohms. |
| R34 | 300 ohms. |
| R38 | 4,700 ohms. |
| L10 | 2.8 microhenries. |
| L15 | 2.8 microhenries. |

From the foregoing it will be understood that the isolator system of the present invention described above is well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. An isolator circuit having an input and an output and providing high attenuation for any signals trying to go through the circuit in the reverse direction, said isolator circuit comprising an electronic amplifier stage having a controlled electrode, a control electrode, and a common electrode, a source of electrical power, circuit means connecting said source of electrical power in circuit in serial relationship with said common electrode and said controlled electrode, an input circuit connected to said controlled electrode, a resistor connected between said input circuit and said control electrode, and an output circuit connected to said control electrode.

2. An isolator circuit as claimed in claim 1 and wherein said resistor is shunted by an adjustable capacitor in series with a second resistor.

3. An isolator system having an input circuit and an output circuit and providing high attenuation for any signals trying to go through the system in the reverse direction, said isolator system comprising an electronic amplifier stage having a controlled electrode, a control electrode, and a common electrode; variable resistance means; a source of electrical power; circuit means connecting said source of electrical power in serial relationship with said common electrode, said controlled electrode, and said variable resistance means; said input circuit being connected to said controlled electrode; second resistance means connected between said input circuit and said control electrode; and said output circuit being connected to said control electrode.

4. An isolator system as claimed in claim 3 and wherein said output circuit includes a peaking coil in series with the primary of a transformer, the secondary of said transformer being adapted to have the load connected thereto.

5. An isolator circuit adapted to pass desired electrical signals therethrough in a forward direction and providing high attenuation for any undesired signals trying to go through the circuit in the reverse direction, said isolator circuit comprising a vacuum tube amplifier stage having an anode, a control grid, and a cathode, a source of electrical power, circuit means connecting said source in circuit across said tube between said cathode and said anode, an input circuit connected to said anode and adapted to have the desired signals applied thereto, resistance means connected in circuit between said input circuit and said control grid, and an output circuit connected to said control grid from which the desired signals are adapted to be fed to a load circuit.

6. An isolator circuit adapted to pass desired electrical signals therethrough in the forward direction and offering high attenuation for signals passing therethrough in the reverse direction comprising a vacuum tube having an anode, a control grid, and a cathode, first variable resistance means, second resistance means shunted by capacitance means, third resistance means, a source of electrical power having first and second terminals, circuit means connecting said first terminal of said source through said third resistance means to said anode and connecting said second terminal through said first and second resistance means in serial relationship to said cathode, fourth resistance means in series with second capacitance means being connected between said anode and said control grid, an input circuit connected to said anode, and an output circuit connected to said control grid.

7. An isolator circuit as claimed in claim 6 and including fifth variable resistance means in series with third capacitance means connected in shunt with said fourth resistance means.

8. An isolator circuit as claimed in claim 6 and wherein said input circuit is connected to said anode through third capacitance means in serial relationship with a peaking coil.

9. An isolator circuit as claimed in claim 6 and wherein a bias voltage which is positive with respect to said second terminal of the electrical source is connected to said control grid through resistance means and a peaking coil in serial relationship.

10. An isolator system for supplying desired electrical signals from a common source to a plurality of independent devices controlled by the signals from said source and in operation wherein said devices are effectively isolated from one another by strongly attenuating undesired signals originating in any one of said devices and attempting to progress back toward said common source, said system comprising a common source, a plurality of isolator circuits having their input terminals coupled to said common source, and a plurality of said controlled devices each coupled to the output terminals of a respective one of said isolator circuits comprising an electronic amplifier stage having a controlled electrode, a control electrode, and a common electrode; variable resistance means; a source of electrical power; circuit means connecting said source in serial relationship with said common electrode, said controlled electrode, and said variable resistance means; the input terminal being connected to said controlled electrode; second resistance means connected between said input circuit and said control terminal; and said output terminal being connected to said control electrode.

11. An isolation circuit having an input terminal and an output terminal and adapted to pass signals therethrough in the forward direction from the input to the output terminal while providing cancellation of any signals attempting to pass therethrough in the reverse direction, said circuit including a vacuum tube having at least an anode, a cathode, and a control electrode, said vacuum tube having its anode coupled to the input terminal, first electrical impedance means coupling the anode to the control electrode, second electrical impedance means connected to the cathode, said vacuum tube having its control electrode coupled to the output terminal, and an energizing circuit for said vacuum tube, said energizing circuit feeding current through said vacuum tube and said second electrical impedance means in serial relationship.

12. An isolation circuit having an input terminal and an output terminal and adapted to pass signals therethrough in the forward direction from the input to the output terminal while providing cancellation of any signals attempting to pass therethrough in the reverse direction, said circuit including a vacuum tube having at least an anode, a cathode, and a control electrode, said vacuum tube having its anode coupled to the input terminal, first electrical impedance means coupling the anode to the control electrode, second electrical impedance means connected to the cathode, said second impedance means having an impedance value approximately equal to the impedance value of said first electrical impedance means, said vacuum tube having its control electrode coupled to the output terminal, and an energizing circuit for said vacuum tube, said energizing circuit feeding current through said vacuum tube and through said second electrical impedance means in serial relationship.

References Cited in the file of this patent

UNITED STATES PATENTS

| | | |
|---|---|---|
| 1,862,020 | Krahl | June 7, 1932 |
| 2,267,579 | Skellett | Dec. 23, 1941 |
| 2,756,282 | Douma | July 24, 1956 |

OTHER REFERENCES

"Radio Engineer's Handbook," Terman, 1st edit., McGraw-Hill, 1943, pp. 317–318.